(12) United States Patent
Sunaga

(10) Patent No.: US 10,893,208 B2
(45) Date of Patent: Jan. 12, 2021

(54) CAMERA MODULE, SELECTOR, CONTROLLER, CAMERA MONITORING SYSTEM, AND MOVEABLE BODY

(71) Applicant: KYOCERA Corporation, Kyoto (JP)

(72) Inventor: Toshihiro Sunaga, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/337,342

(22) PCT Filed: Sep. 19, 2017

(86) PCT No.: PCT/JP2017/033759
§ 371 (c)(1),
(2) Date: Mar. 27, 2019

(87) PCT Pub. No.: WO2018/061882
PCT Pub. Date: Apr. 5, 2018

(65) Prior Publication Data
US 2020/0036903 A1 Jan. 30, 2020

(30) Foreign Application Priority Data
Sep. 28, 2016 (JP) ................................. 2016-190444

(51) Int. Cl.
| | |
|---|---|
| *H04N 7/18* | (2006.01) |
| *H04N 5/232* | (2006.01) |
| *H04N 5/247* | (2006.01) |
| *B60R 1/00* | (2006.01) |
| *B60R 1/12* | (2006.01) |

(Continued)

(52) U.S. Cl.
CPC ..... *H04N 5/23299* (2018.08); *H04N 5/23229* (2013.01); *H04N 5/247* (2013.01); *B60R 1/00* (2013.01); *B60R 1/12* (2013.01); *B60R 2001/1253* (2013.01);

(Continued)

(58) Field of Classification Search
CPC ....... B60R 1/00; B60R 2300/105; B60R 1/12; B60R 2001/253; H04N 7/181; H04N 5/232; H04N 5/23299; H04N 5/23229; H04N 5/247; H04N 17/002; H04N 5/2628; H04N 5/268
USPC ...... 348/148, 159, 180, 187, 207.99, 211.11, 348/211.13, 333.01, 704, 705
See application file for complete search history.

(56) References Cited

U.S. PATENT DOCUMENTS

| | | | | |
|---|---|---|---|---|
| 2012/0069188 A1* | 3/2012 | Ohno | ........................ | B60R 1/00 |
| | | | | 348/148 |
| 2016/0014406 A1* | 1/2016 | Takahashi | ................. | G06T 7/73 |
| | | | | 348/148 |

FOREIGN PATENT DOCUMENTS

| | | | |
|---|---|---|---|
| DE | 102010023199 A1 | 2/2011 | |
| JP | 2004-363937 A | 12/2004 | |

(Continued)

*Primary Examiner* — Sherrie Hsia
(74) *Attorney, Agent, or Firm* — Studebaker & Brackett PC

(57) ABSTRACT

A camera module includes a first camera and a second camera capable of switching between a first imaging direction and a second imaging direction. The first camera captures images in a first imaging range when the second camera is facing the first imaging direction. The second camera captures images in a second imaging range when facing the first imaging direction. The second camera captures images in a third imaging range when facing the second imaging direction. The overlapping range between the first imaging range and the third imaging range is greater than the overlapping range between the first imaging range and the second imaging range.

12 Claims, 11 Drawing Sheets

(51) Int. Cl.
  *H04N 5/262*      (2006.01)
  *H04N 17/00*     (2006.01)
(52) U.S. Cl.
  CPC ...... *B60R 2300/105* (2013.01); *H04N 5/2628* (2013.01); *H04N 17/002* (2013.01)

(56)        References Cited

FOREIGN PATENT DOCUMENTS

| | | |
|---|---|---|
| JP | 2010-187161 A | 8/2010 |
| JP | 2011-182328 A | 9/2011 |
| JP | 2014-039096 A | 2/2014 |

\* cited by examiner

Front ←——→ Back

CAMERA MODULE, SELECTOR, CONTROLLER, CAMERA MONITORING SYSTEM, AND MOVEABLE BODY

CROSS-REFERENCE TO RELATED APPLICATION

The present application claims priority to and the benefit of Japanese Patent Application No. 2016-190444 filed Sep. 28, 2016, the entire contents of which are incorporated herein by reference.

TECHNICAL FIELD

The present disclosure relates to a camera module, a selector, a controller, a camera monitoring system, and a moveable body.

BACKGROUND

A monitoring system in which a plurality of cameras are attached to an automobile is known. If one of the cameras fails in such a system, a replacement camera to replace the failed camera can be moved to the position of the failed camera, thereby allowing the driver to continue monitoring the video.

SUMMARY

A camera module according to an embodiment of the present disclosure includes a first camera and a second camera capable of switching between a first imaging direction and a second imaging direction. The first camera is configured to capture images in a first imaging range when the second camera is facing the first imaging direction. The second camera is configured to capture images in a second imaging range when facing the first imaging direction and to capture images in a third imaging range when facing the second imaging direction. The overlapping range between the first imaging range and the third imaging range is greater than the overlapping range between the first imaging range and the second imaging range.

A selector according to an embodiment of the present disclosure is configured to acquire a first processed image generated by execution of a first process on a first captured image acquired from a first camera. The selector is configured to acquire a second processed image generated by execution of a second process on a second captured image acquired from a second camera capable of switching between a first imaging direction and a second imaging direction, the second process being executed when the second camera is facing the first imaging direction. The selector is configured to acquire a third processed image generated by execution of a third process on the second captured image when the second camera is facing the second imaging direction. The selector is configured to output the first processed image when the second camera is facing the first imaging direction and to output the third processed image when the second camera is facing the second imaging direction.

A controller according to an embodiment of the present disclosure is configured to acquire a first captured image from a first camera and is capable of executing a first process on the acquired first captured image to generate a first processed image. The controller is configured to acquire a second captured image from a second camera capable of switching between a first imaging direction and a second imaging direction and is capable of generating a second processed image yielded by execution of a second process on the acquired second captured image. The controller is capable of generating a third processed image yielded by execution of a third process on the acquired second captured image, the third process being different from the second process.

A camera module according to an embodiment of the present disclosure includes a first camera, a second camera capable of switching between a first imaging direction and a second imaging direction, and a controller. The first camera is configured to capture images in a first imaging range when the second camera is facing the first imaging direction. The second camera is configured to capture images in a second imaging range when facing the first imaging direction and to capture images in a third imaging range when facing the second imaging direction. The controller is configured to acquire a first captured image captured by the first camera when the second camera is facing the first imaging direction. The controller is capable of executing a first process on the acquired first captured image to generate a first processed image and is configured to acquire a second captured image captured by the second camera when the second camera is facing the first imaging direction. The controller is capable of executing a second process on the acquired second captured image to generate a second processed image. The controller is configured to acquire a second captured image captured by the second camera when the second camera is facing the second imaging direction and is capable of executing a third process on the acquired second captured image to generate a third processed image. The overlapping range between the first processed image and the third processed image is greater than the overlapping range between the first processed image and the second processed image.

A camera monitoring system according to an embodiment of the present disclosure includes a first camera, a second camera capable of switching between a first imaging direction and a second imaging direction, a controller, and a monitor. The controller is configured to acquire a first captured image from the first camera and to execute a first process on the first captured image to generate a first processed image. The controller is configured to acquire a second captured image from the second camera and execute a second process on the second captured image captured when the second camera is facing the first imaging direction to generate a second processed image. The controller is configured to execute a third process on the second captured image captured when the second camera is facing the second imaging direction to generate a third processed image. The monitor is configured to display the first processed image when the second camera is facing the first direction and to display the third processed image when the second camera is facing the second direction.

A moveable body according to an embodiment of the present disclosure includes a first camera, a second camera capable of switching between a first imaging direction and a second imaging direction, a controller, and a monitor. The controller is configured to acquire a first captured image from the first camera and to execute a first process on the first captured image to generate a first processed image. The controller is configured to acquire a second captured image from the second camera and execute a second process on the second captured image captured when the second camera is facing the first imaging direction to generate a second processed image. The controller is configured to execute a third process on the second captured image captured when the second camera is facing the second imaging direction to generate a third processed image. The monitor is configured to display the first processed image when the second camera is facing the first direction and to display the third processed image when the second camera is facing the second direction.

DETAILED DESCRIPTION

Embodiments of the present disclosure are described below with reference to the drawings.

First Embodiment

Figure 1A:
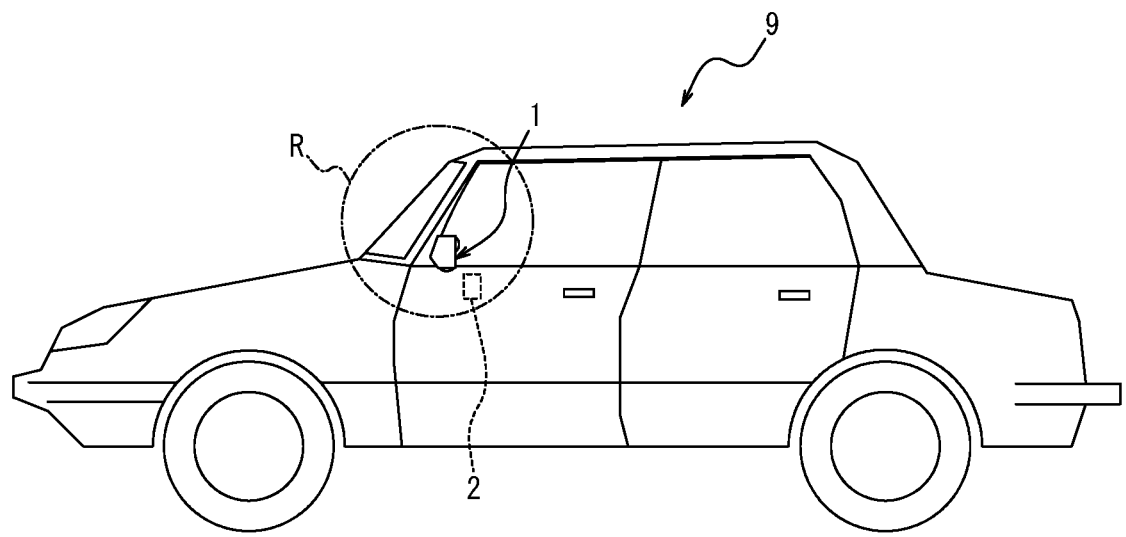
FIG. 1A is a schematic side view of a moveable body, according to a first embodiment of the present disclosure, to which a camera module and a monitor are attached.

FIG. 1A is a schematic side view of a moveable body 9 according to a first embodiment of the present disclosure. The moveable body 9 includes a camera module 1 and a monitor 2. The camera module 1 and the monitor 2 are configured to be capable of transmitting signals over a dedicated line or a network such as a controller area network (CAN).

Figure 1B:
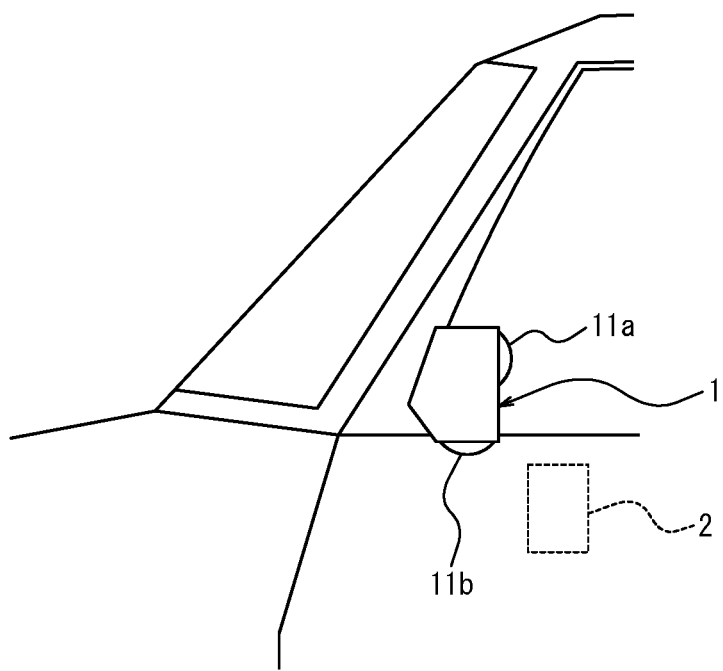
FIG. 1B is an enlarged view of a region R in FIG. 1A.

FIG. 1B is an enlarged view of a region R at the upper-front portion of the front door in FIG. 1A. The camera module 1 includes a first camera 11a and a second camera 11b and captures images in a predetermined range. Details are provided below.

The term "moveable body" in the present disclosure includes vehicles, ships, and aircraft. The term "vehicle" in the present disclosure includes, but is not limited to, automobiles, railway vehicles, industrial vehicles, and vehicles for daily life. For example, the term "vehicle" may include airplanes that travel down a runway. Examples of automobiles include, but are not limited to, passenger vehicles, trucks, buses, motorcycles, and trolley buses, and may include other vehicles that travel on the road. Railway vehicles include, but are not limited to, locomotives, freight cars, passenger cars, streetcars, guided railway vehicles, ropeways, cable cars, linear motor cars, and monorails, and may include other vehicles that travel along a track. Industrial vehicles include industrial vehicles for agriculture and for construction. Industrial vehicles include, but are not limited to, forklifts and golf carts. Industrial vehicles for agriculture include, but are not limited to, tractors, cultivators, transplanters, binders, combines, and lawnmowers. Industrial vehicles for construction include, but are not limited to, bulldozers, scrapers, backhoes, cranes, dump cars, and road rollers. Vehicles for daily life include, but are not limited to, bicycles, wheelchairs, baby carriages, wheelbarrows, and motorized, two-wheeled standing vehicles. Power engines for the vehicle include, but are not limited to, internal-combustion engines including diesel engines, gasoline engines, and hydrogen engines, and electrical engines including motors. The term "vehicle" includes human-powered vehicles. The vehicle is not limited to the above-listed types. For example, automobiles may include industrial vehicles that can drive on the road, and the same vehicle may be included in multiple categories.

Figure 2A:
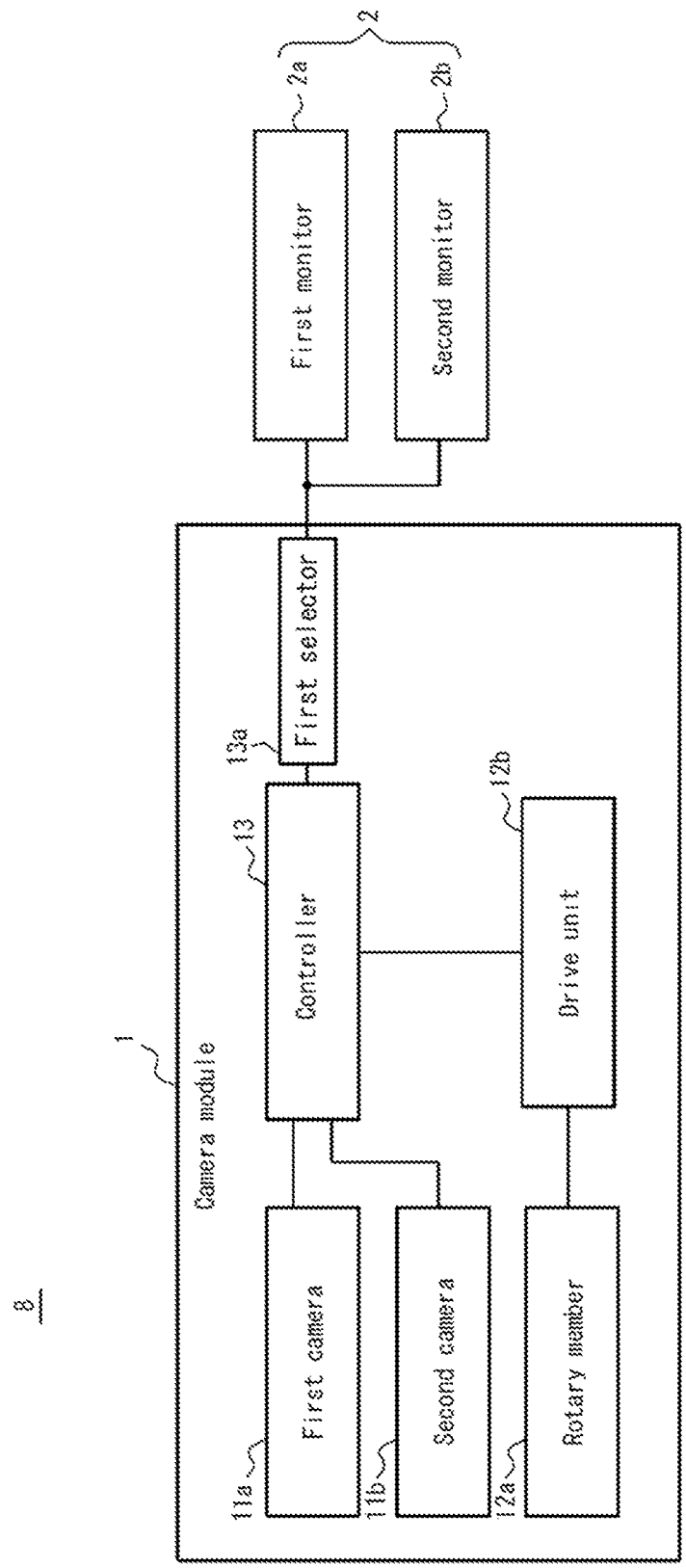
FIGS. 2A and 2B are functional block diagrams of the camera module and the monitor of FIG. 1.
Figure 2B:
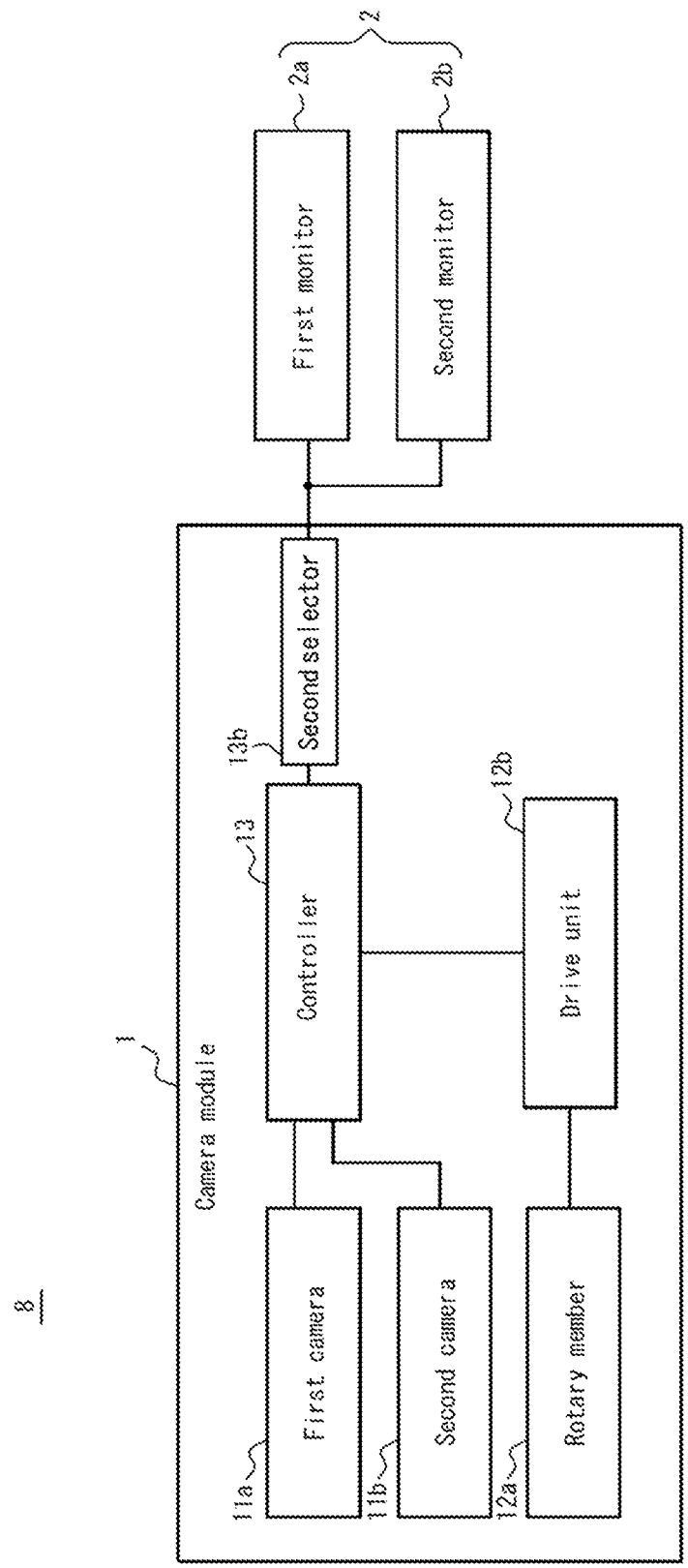

FIGS. 2A and 2B are functional block diagrams illustrating the schematic configuration of a camera monitoring system 8. The camera monitoring system 8 includes the camera module 1 and the monitor 2. The camera module 1 includes the first camera 11a, the second camera 11b, a rotary member 12a, a drive unit 12b, a controller 13, and a first selector 13a.

The first camera 11a and the second camera 11b each include an optical system and an image sensor. The optical system is configured by an optical element including at least one lens and has desired optical properties. The desired optical properties are, for example, the focal depth or the angle of view. The optical system forms a subject image on the image sensor. The image sensor is, for example, a charge-coupled device (CCD) image sensor or a complementary MOS (CMOS) image sensor. The image sensor generates an image signal corresponding to the subject imaged on an optical detection surface. A plurality of pixels are arrayed in two dimensions on the optical detection surface of the image sensor. Each pixel generates a pixel signal corresponding to the detected amount of light. An image signal of one frame is formed by the pixel signals generated by the pixels constituting the optical detection surface. The first camera 11a and the second camera 11b output their captured images to the controller 13.

Figure 3A:
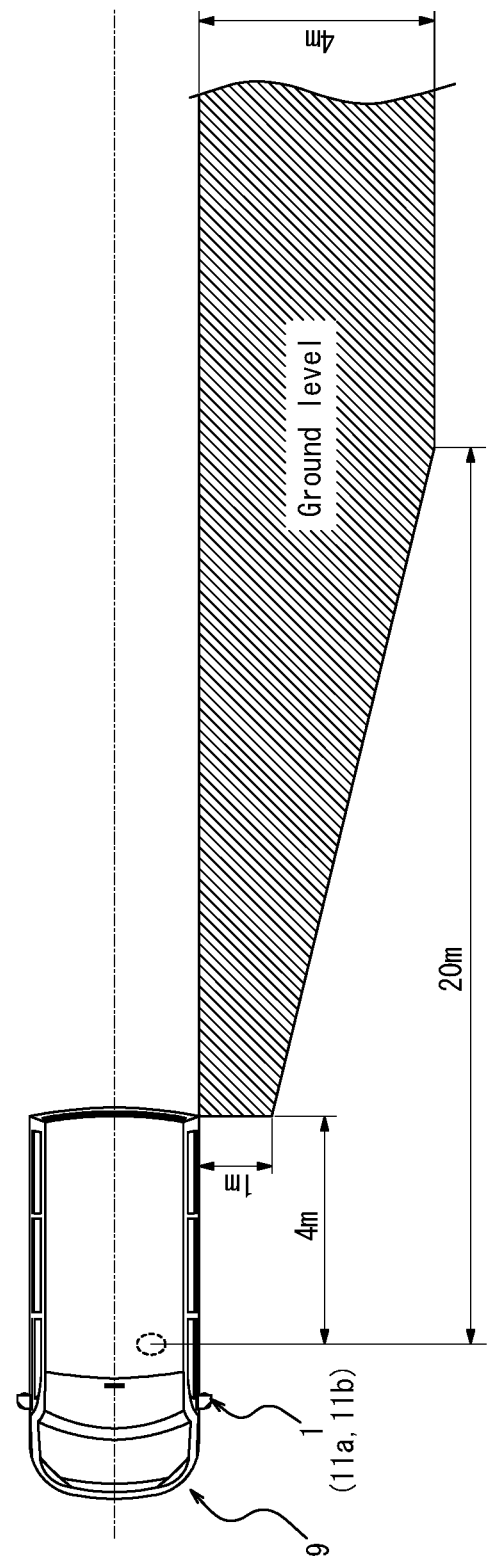
FIG. 3A illustrates a portion of an imaging range of a first camera as seen from above the moveable body.
Figure 3B:
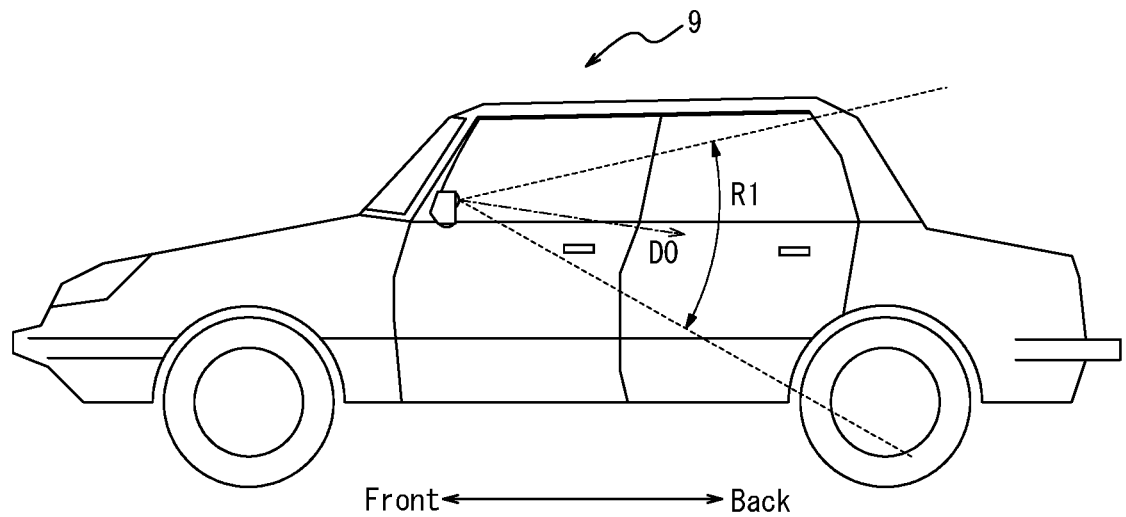
FIG. 3B illustrates the imaging range of the first camera as seen from the side of the moveable body.
Figure 3C:
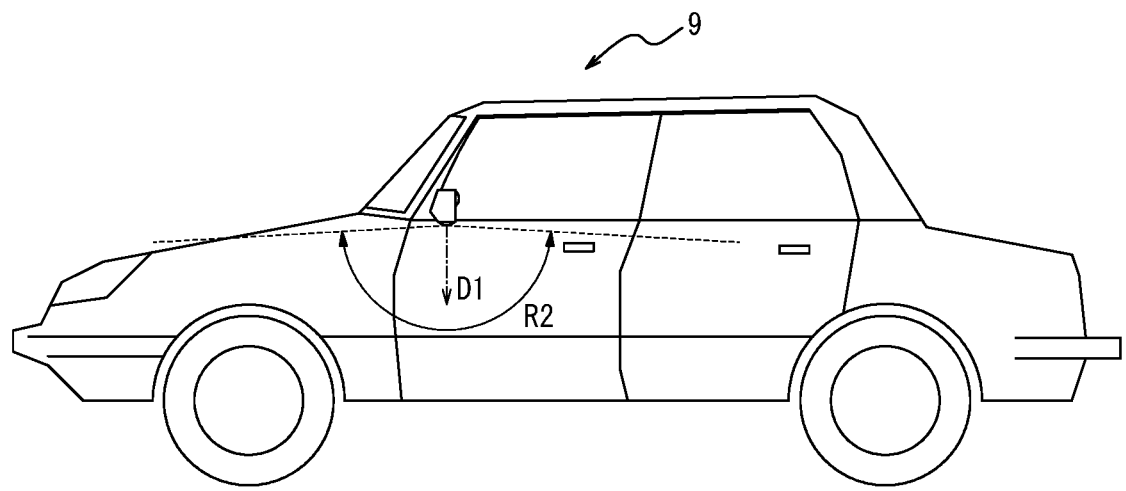
FIG. 3C illustrates an imaging range of a second camera as seen from the side of the moveable body.

FIG. 3A illustrates the relationship between the imaging range of the camera module 1 and the moveable body 9. FIG. 3B illustrates the relationship between an imaging direction D0 and a first imaging range R1. FIG. 3C illustrates the relationship between a first imaging direction D1 and a second imaging range R2. In an example, the first camera 11a is a camera for an electronic mirror. At the first rotation position, described below, the orientation of the first camera 11a is determined to allow imaging of the view in the imaging range established by law, for example. The imaging range is as follows in the "Proposal for Supplement 2 to the 04 series of amendments to Regulation No. 46 (Devices for indirect vision)" submitted by the Economic and Social Council of the United Nations, for example. Specifically, as illustrated in FIG. 3A, the imaging range has an outward width of 1 m from the side of the moveable body 9 at a position 4 m behind the driver on the ground. The imaging range is a range including an outward width of 4 m from the side of the moveable body 9 at a position 20 m or more behind the driver (see the shaded portion). The imaging range is set to increase monotonically, from the position 4 m behind the driver to the position 20 m behind the driver, in correspondence with the distance from the driver.

The first camera 11a faces the imaging direction D0 to be capable of capturing images in such an imaging range. Facing the imaging direction D0 refers to a state in which the optical axis of the first camera 11a is parallel to the imaging direction D0, as illustrated in FIG. 3B, and in which the first camera 11a can capture an image of a subject in the imaging direction D0. The imaging direction D0 is towards the rear of the moveable body 9 and somewhat downwards. In an example, the depression angle between the horizontal direction and the imaging direction D0 is approximately 15°. In an example, the angle between the horizontal component of the imaging direction D0 and the front-back direction of the moveable body 9 is approximately 20°. The first camera 11a captures an image in the first imaging range R1, which is a predetermined angle of view, such as 45°, centered on the optical axis direction.

In an example, the second camera 11b is a camera for monitoring to the side. In the first rotation position, described below, the optical axis of the second camera 11b is parallel to the first imaging direction D1 illustrated in FIG. 3C. In an example, the first imaging direction D1 faces downward in the vertical direction. The second camera 11b captures an image in the second imaging range R2, which is an angle of view of 170°, centered on the optical axis. The lens included in the optical system of the second camera 11b is a lens with a wider angle of view than the lens included in the optical system of the first camera 11a. This lens is, for example, a fish-eye lens.

The rotary member 12a is a rotatable mechanism. The rotary member 12a rotates to switch between the first rotation position and the second rotation position. At least the second camera 11b rotates as a result of switching of the rotation position of the rotary member 12a. The imaging direction of the second camera 11b changes by rotation of the rotary member 12a. The first camera 11a may rotate as a result of switching of the rotation position of the rotary member 12a. The imaging direction of the first camera 11a may change by rotation of the rotary member 12a.

The drive unit 12b includes at least one motor, for example. The drive unit 12b is controlled by the controller 13, for example, to drive the rotary member 12a. The rotary member 12a may be a mechanism allowing manual rotation. The drive unit 12b may be omitted.

The drive unit 12b may rotate the second camera 11b about its optical axis. The drive unit 12b may include a mechanism to rotate the second camera 11b directly. The drive unit 12b may rotate the second camera 11b about its optical axis when changing the position of the second camera 11b via the rotary member 12a. The drive unit 12b may include a plurality of motors.

Figure 4A:
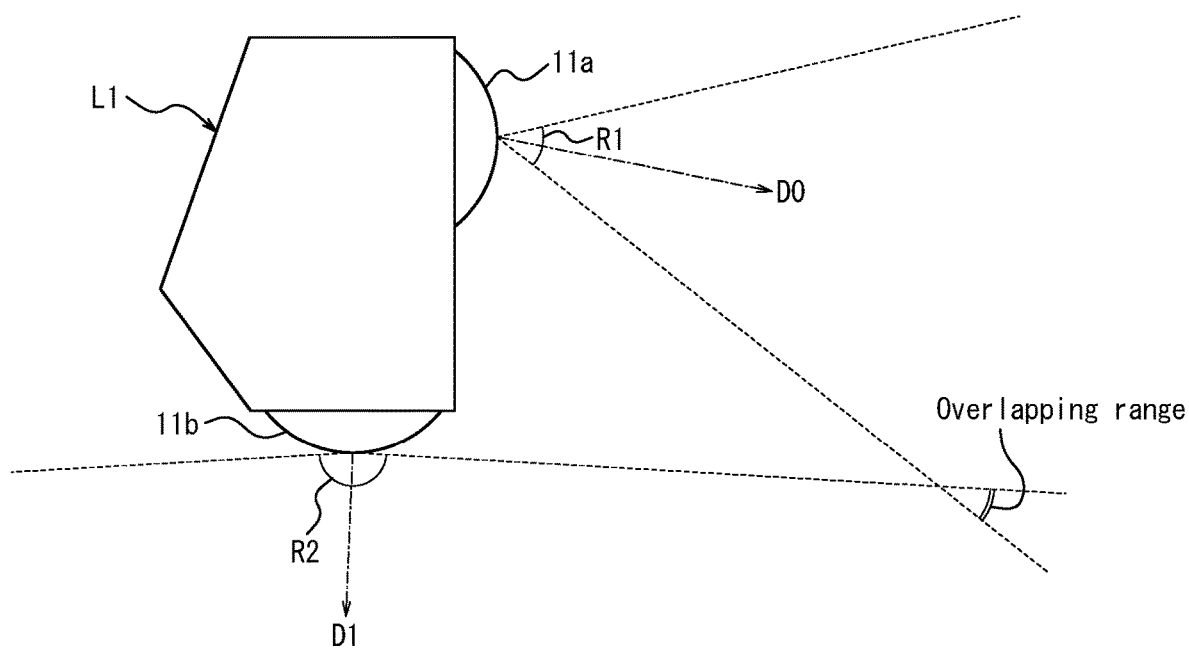
FIG. 4A illustrates the appearance of the camera module at a first rotation position.
Figure 4B:
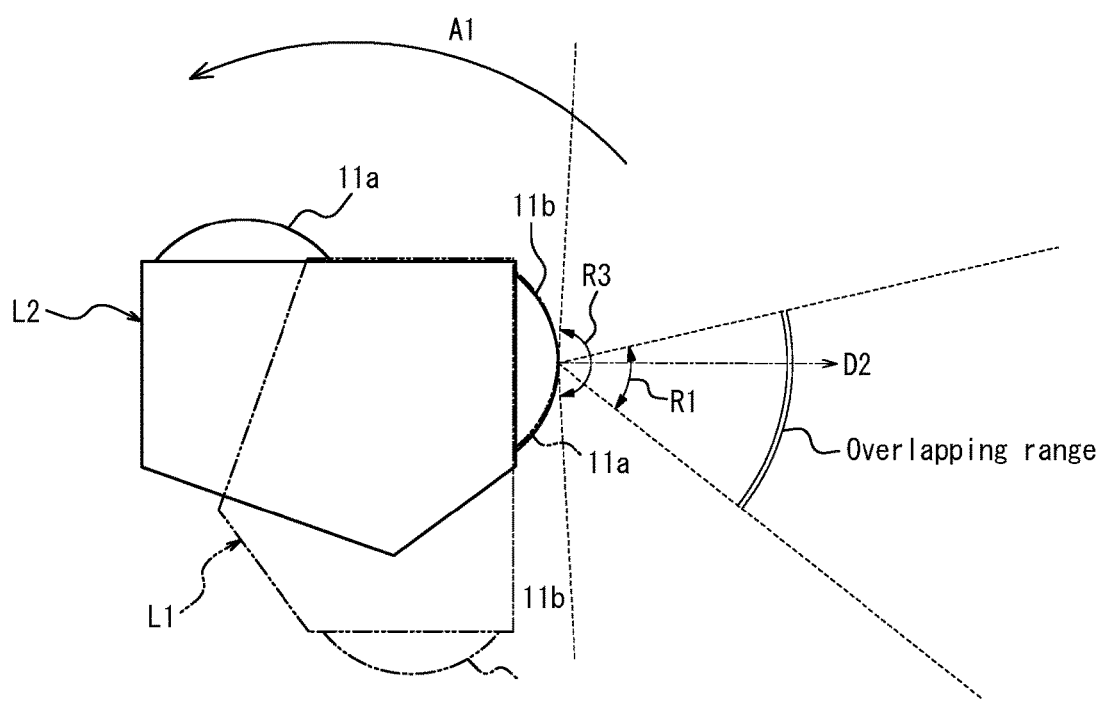
FIG. 4B illustrates the appearance of the camera module at a second rotation position.

FIG. 4A and FIG. 4B illustrate rotation of the camera module 1. FIG. 4A illustrates a first rotation position L1 of the camera module 1. At this time, the first camera 11a, the second camera 11b, and the rotary member 12a are at the first rotation position L1. FIG. 4B illustrates rotation of the camera module 1. The camera module 1 rotates in the direction indicated by the arrow A1 from the first rotation position L1 to the second rotation position L2. As a result of rotation, the first camera 11a, the second camera 11b, and the rotary member 12a are positioned at the second rotation position L2. As illustrated in FIG. 4A, the first camera 11a faces the imaging direction D0 at the first rotation position L1 and captures an image in the first imaging range R1. The second camera 11b faces the first imaging direction D1 at the first rotation position and captures an image in the second imaging range R2.

As illustrated in FIG. 4B, the second camera 11b faces the second imaging direction D2 at the second rotation position. At this time, a third imaging range R3 may include the imaging range illustrated in FIG. 3A. In an example, the second imaging direction D2 substantially matches the imaging direction D0. The second imaging direction D2 is not limited to matching the imaging direction D0. The second imaging direction D2 may have the same orientation as the imaging direction D0, or the second imaging direction D2 may be a different direction from the imaging direction D0.

References to the rotation position of the camera module 1 may be synonymous with references to the imaging direction of the second camera 11b. For example, stating that the camera module 1 is at the first rotation position may be synonymous with stating that the second camera 11b is facing the first imaging direction D1. Stating that the camera module 1 is at the second rotation position may be synonymous with stating that the second camera 11b is facing the second imaging direction D2.

As a result of rotation of the rotary member 12a, the overlapping range between the third imaging range R3 and the first imaging range R1 of the first camera 11a is greater than the overlapping range between the second imaging range R2 and the first imaging range R1. The overlapping range between the first imaging range R1 when the first camera 11a is facing the imaging direction D0 and the third imaging range R3 is wider than the overlapping range between the first imaging range R1 and the second imaging range R2.

The description now returns to FIGS. 2A and 2B. The controller 13 includes one or more processors. The controller 13 may include one or more memories that store programs for various processes and store information during calculations. The term "memory" encompasses volatile memory and non-volatile memory. The memory may be configured as a memory independent from the processor and/or a memory built into the processor. The term "processor" encompasses universal processors that execute particular functions by reading particular programs and dedicated processors that are specialized for particular processing. The controller 13 may be either a system-on-a-chip (SoC) or a system in a package (SiP) with one processor or a plurality of processors that work together. The controller 13 may drive the drive unit 12b at least to change the imaging direction of the second camera 11b.

The controller 13 acquires a first captured image from the first camera 11a. The controller 13 executes a normal process (first process) on the first captured image to generate a first processed image. The controller 13 outputs the generated first processed image. The normal process of the present embodiment includes, for example, white balance adjustment, γ correction, or the like on the first captured image. The white balance adjustment, γ correction, or the like may be termed pre-processing. The normal process of the present embodiment may further include color interpolation, contour enhancement, or the like on the first captured image. The color interpolation, contour enhancement, or the like may be performed on the first captured image subjected to pre-processing. The color interpolation, contour enhancement, or the like may be termed post-processing. In addition to the aforementioned processes, the normal process of the present embodiment may include at least one of a correction process to correct distortion of the first captured image, an extraction process to extract a partial region from the first captured image, an electronic zoom process to extract and expand a partial region from the first captured image, a sharpness process to sharpen the first captured image, and a super-resolution process to increase the resolution of the first captured image by digital processing. The extraction process may be omitted from the electronic zoom process for a first captured image already subjected to the extraction process.

The controller 13 acquires a second captured image from the second camera 11b. The controller 13 executes a normal process (second process) on the second captured image to generate a second processed image. The controller 13 outputs the generated second processed image. The normal process executed on the second captured image may be the same as the normal process executed on the first captured image, or a portion thereof may differ.

The controller 13 executes a conversion process (third process), described below, on the second captured image to generate a third processed image. The controller 13 outputs the generated third processed image.

The conversion process of the present embodiment differs from the normal process in the following way. Distortion correction within the conversion process is executed on the basis of different parameters from distortion correction within the normal process. In the distortion correction within the conversion process, a different substitution table than that of the distortion correction within the normal process is used. By the distortion correction in the conversion process, the third processed image is brought closer to the first processed image than the second processed image in terms of visual distortion after correction. The extraction process within the conversion process is executed on the basis of different parameters from the extraction process within the normal process. The extraction process within the conversion process extracts a narrower range than the range extracted by the extraction process within the normal process. In the extraction process within the conversion process, the aspect ratio differs from that of the range extracted by the extraction process within the normal process. The aspect ratio extracted by the extraction process within the conversion process is closer to the aspect ratio of the first processed image than the aspect ratio of the second processed image. The aspect ratio extracted by the extraction process within the conversion process may be the same as the aspect ratio of the first processed image. The electronic zoom process within the conversion process is executed so that the size of an object in the third processed image is brought closer to the size of an object in the first processed image.

For example, in the conversion process on the second captured image, the third processed image is generated by combining the processes so that the display conditions are brought closer to, or made to match, the first processed image. The imaging range (angle of view) and aspect ratio of a cut-out image and the imaging range (angle of view) and aspect ratio of the first processed image are brought closer, or made to match, by the controller 13. A predetermined region is established in advance on the basis of the difference in the angles of view of the lens included in the first camera 11a and the lens included in the second camera 11b. The controller 13 executes an electronic zoom process on a cut-out image so that the size of the image after the electronic zoom and the size of the first processed image are closer or match. The controller 13 may execute at least one of a sharpness process and a super-resolution process.

During the above-described conversion process, the processes included in the conversion process may be executed in any order. The above-described conversion process may be executed by coordinate transformation of the pixels, for example. The controller 13 may, for example, transform the coordinates of the pixels in the second captured image into coordinates of a different coordinate system determined in advance.

At least a portion of the processing differs between the conversion process and the normal process. At least a portion of the processing is considered to differ when one of the normal process and the conversion process includes a process not included in the other. At least one process by the controller 13 may be considered a portion of the conversion process and the normal process. The conversion process may include the same processes as the normal process. The controller 13 may execute a new process on the second processed image to generate the third processed image.

Periodically, or at a predetermined point in time, the controller 13 judges whether the first camera 11a has failed as follows. The controller 13 may judge that the first camera 11a has failed when a portion is missing in the first captured image acquired from the first camera 11a. The controller 13 may judge that the first camera 11a has failed when the first camera 11a does not operate. The controller 13 may judge that the first camera 11a has failed when it is detected that the lens has cracked or that the optical axes of the lens and the image sensor are misaligned.

The controller 13 maintains the first rotation position when judging that the first camera 11a has not failed, i.e. that the first camera 11a is normal.

When judging that the first camera 11a has failed, the controller 13 provides notification of the failure. The notification may, for example, include displaying an indication of failure on the first monitor 2a or the second monitor 2b described below. The notification may be provided by audio or by turning on a lamp.

When judging that the first camera 11a has failed, the controller 13 may control the drive unit 12b to set the rotary member 12a to the second rotation position. The rotary member 12a may be rotated automatically by the drive unit 12b when it is judged that the first camera 11a has failed. The rotary member 12a may be rotated by the drive unit 12b when a switching instruction is received from the driver or a passenger. The controller 13 may provide notification on the first monitor 2a or the second monitor 2b that the first camera 11a is being switched to the second camera 11b.

When rotation of the second camera 11b is complete, the controller 13 may, for example, provide notification on the first monitor 2a or the second monitor 2b that switching from the first camera 11a to the second camera 11b is complete. The controller 13 may provide notification on the first monitor 2a or the second monitor 2b that the range that was being imaged by the first camera 11a is being imaged by the second camera 11b.

The first selector 13a acquires the first processed image, the second processed image, and the third processed image from the controller 13. The first selector 13a receives the rotation position of the rotary member 12a (the first rotation position or the second rotation position) from the controller 13. When the rotary member 12a is at the first rotation position, the first selector 13a outputs at least one of the first processed image and the second processed image. When the rotary member 12a is at the second rotation position, the first selector 13a outputs the third processed image instead of the first processed image. The first selector 13a may judge whether the rotation position of the rotary member 12a is the first rotation position or the second rotation position.

The above-described monitor 2 is, for example, a liquid crystal display (LCD) or an organic or inorganic EL display. The monitor 2 is provided in the cabin of the moveable body 9 at a position visible to the driver. In the present embodiment, the monitor 2 includes the first monitor 2a, which is a dedicated monitor, and the second monitor 2b, which is a general-purpose monitor. The first monitor 2a is a screen continually displaying the captured image of the area behind the moveable body 9. The general-purpose monitor displays the captured image of the area to the side of the moveable body 9, a car navigation system screen, or the like in correspondence with the driving conditions. The first monitor 2a can display the first processed image and the third processed image. The first monitor 2a may display the first processed image when the second camera 11b is facing the first imaging direction D1. The first monitor 2a may display the third processed image when the second camera 11b is facing the second imaging direction D2. The second monitor 2b can display the second processed image. The second monitor 2b may display the second processed image when the second camera 11b is facing the first imaging direction D1. The second monitor 2b may suspend display of the second processed image when the second camera 11b is facing the second imaging direction D2.

The processing executed by the controller 13 in the camera module 1 periodically or at a predetermined point in time is described with reference to FIG. 5A.

Figure 5A:
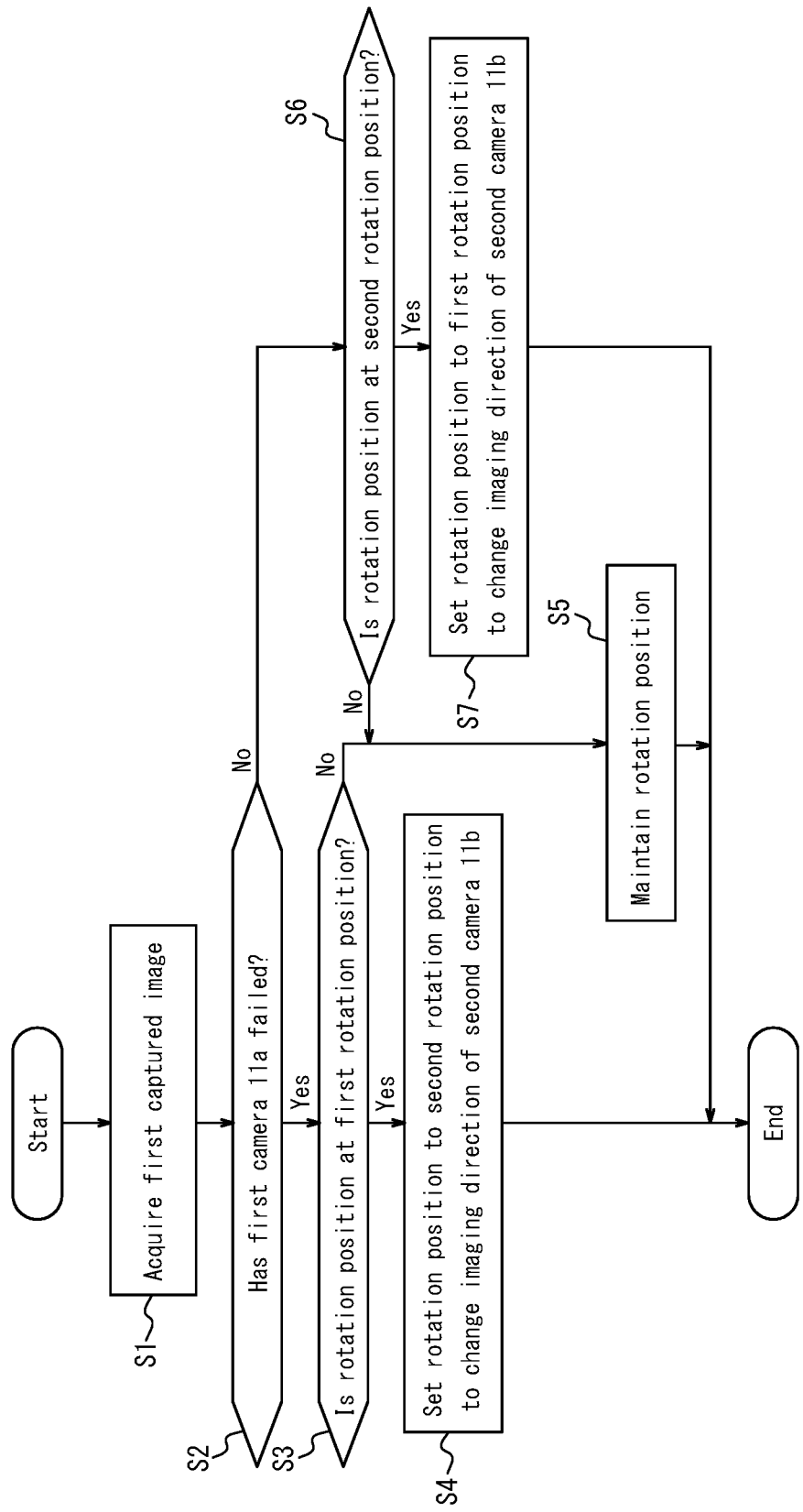
FIG. 5A is a flowchart illustrating operations of a controller in the camera module of FIG. 1.

FIG. 5A is a flowchart illustrating operations of the controller 13. The controller 13 executes the processing in FIG. 5A periodically or at a predetermined point in time. The controller 13 may, for example, execute the processing in FIG. 5A at predetermined intervals. The controller 13 may for example, execute the processing in FIG. 5A when acquiring the first captured image. In step S1, the controller 13 acquires at least the first captured image from the first camera 11a. In step S2, the controller 13 judges whether the first camera 11a has failed. When the judgment result in step S2 is Yes, the controller 13 judges in step S3 whether the rotation position is at the first rotation position. When the judgment result in step S3 is Yes, the controller 13 drives the drive unit 12b to set the rotation position to the second rotation position and change the imaging direction of the second camera 11b. When the judgment result in step S3 is No, the controller 13 maintains the rotation position at the second rotation position in step S5.

When the judgment result in step S2 is No, the controller 13 judges in step S6 whether the rotation position is at the second rotation position. When the judgment result in step S6 is Yes, the controller 13 sets the rotation position to the first rotation position to change the imaging direction of the second camera 11b in step S7. When the judgment result in step S6 is No, the controller 13 maintains the rotation position at the first rotation position in step S5.

Figure 5B:
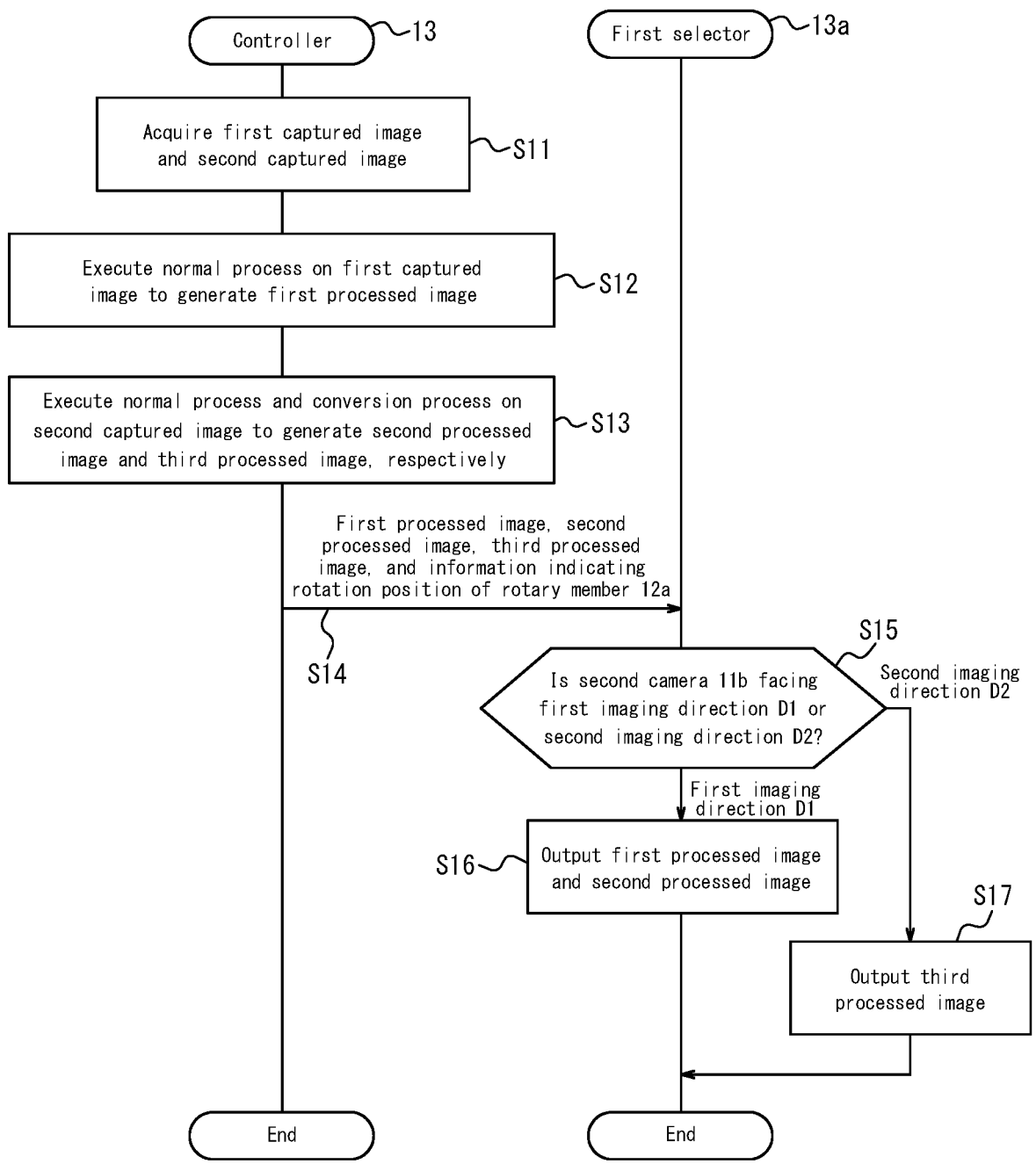
FIG. 5B is a sequence diagram illustrating operations of the controller and a selector in the camera module of FIG. 1.

The processing executed by the controller 13 and the first selector 13a in the camera module 1 each time the first captured image of one frame is acquired from the first camera 11a and the second captured image of one frame is acquired from the second camera 11b is described with reference to FIG. 5B.

In step S11, the controller 13 acquires the first captured image from the first camera 11a and the second captured image from the second camera 11b. In step S12, the controller 13 executes a normal process on the first captured image to generate a first processed image. In step S13, the controller 13 executes a normal process and a conversion process on the second captured image to generate a second processed image and a third processed image, respectively.

In step S14, the controller 13 outputs the first processed image, the second processed image, the third processed image, and information indicating the rotation position of the rotary member 12a to the first selector 13a.

In step S15, the first selector 13a judges whether the second camera 11b is facing the first imaging direction D1 or the second imaging direction D2 on the basis of the information indicating the rotation position of the rotary member 12a.

When the second camera 11b is facing the first imaging direction D1 in step S15, the first selector 13a outputs the first processed image and the second processed image in step S16.

When the second camera 11b is facing the second imaging direction D2 in step S15, the first selector 13a outputs the third processed image to the first monitor 2a in step S17. The first selector 13a does not output the second processed image.

The controller 13 in the present embodiment can generate the third processed image on which the third process differing from the second process is executed. The overlapping range between the first imaging range R1 and the third imaging range R3 is wider than the overlapping range between the first imaging range R1 and the second imaging range R2. The view and subjects in the first imaging range R1 of the first camera 11a can be captured over a wider range in the third imaging range R3 than in the second imaging range R2. Even when the first camera 11a has failed, the second camera 11b can cover the first imaging range R1, thereby improving convenience for the driver.

The controller 13 in the present embodiment can generate the third processed image yielded by execution of the third process, which differs from the second process, on the acquired second captured image. For example, the controller 13 can therefore acquire the second captured image with the second camera 11b and generate the third processed image by executing the conversion process on the acquired second captured image to bring the display conditions closer to those of the first processed image. Accordingly, even if the first camera 11a and the second camera 11b have different display conditions in accordance with use, the first processed image and the third processed image when the first camera 11a is functioning normally can be made to appear more similar. The risk of the driver perceiving images as unnatural is thereby reduced, further improving convenience for the driver.

The controller 13 of the present embodiment outputs the third processed image when it is judged that the second camera 11b is facing the second imaging direction D2. The controller 13 generates the second processed image when the second camera 11b is facing the first imaging direction D1. The necessary image can thus be generated in accordance with the imaging direction of the second camera 11b.

The first selector 13a of the present embodiment outputs the second processed image when the second camera 11b is facing the first imaging direction D1 and outputs the third processed image when the second camera 11b is facing the second imaging direction D2. Therefore, the appropriate image can be output in accordance with the imaging direction of the second camera 11b.

The controller 13 of the present embodiment executes at least one of a sharpness process and a super-resolution process to generate the third processed image. The occurrence of blurriness or decreased resolution, which may occur when bringing the display conditions of the first processed image closer to the display conditions of the third processed image, can therefore be reduced. This can improve the quality of the third processed image.

Second Embodiment

In the first embodiment, the second camera 11b is a camera for monitoring to the side of the moveable body 9. In the second embodiment, the second camera 11b is a camera for confirming the diagonally-left direction in front of the moveable body 9, for example.

Since the functional block diagram of the second embodiment is the same as the functional block diagram of the first embodiment, a description thereof is omitted. A description of other matter identical to the first embodiment is also omitted.

Figure 6:
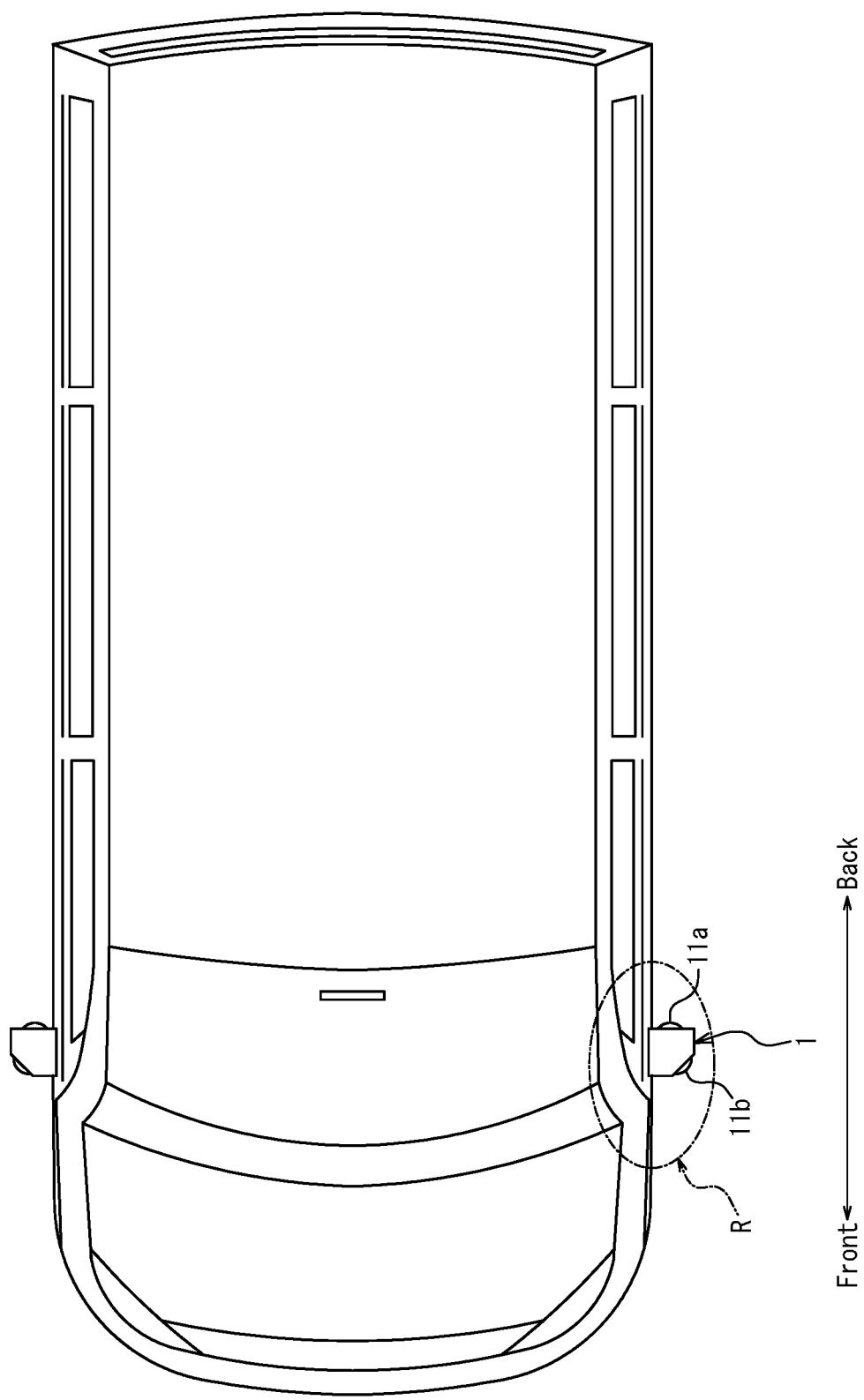
FIG. 6 is a schematic top view of a moveable body, according to a second embodiment, to which a camera module is attached.

FIG. 6 is a top view of the moveable body 9. As illustrated in FIG. 6, the camera module 1 is attached to the left side of the moveable body 9. The first camera 11a can capture images of the area behind the moveable body 9, as in the first embodiment. The second camera 11b can capture images in the diagonally-left direction in front of the moveable body 9. A camera module including a camera capable of capturing images of the area behind the moveable body 9 and a camera capable of capturing images in the diagonally-right direction in front of the moveable body 9 may be attached to the right side of the moveable body 9 at a position corresponding to the camera module 1.

Figure 7A:
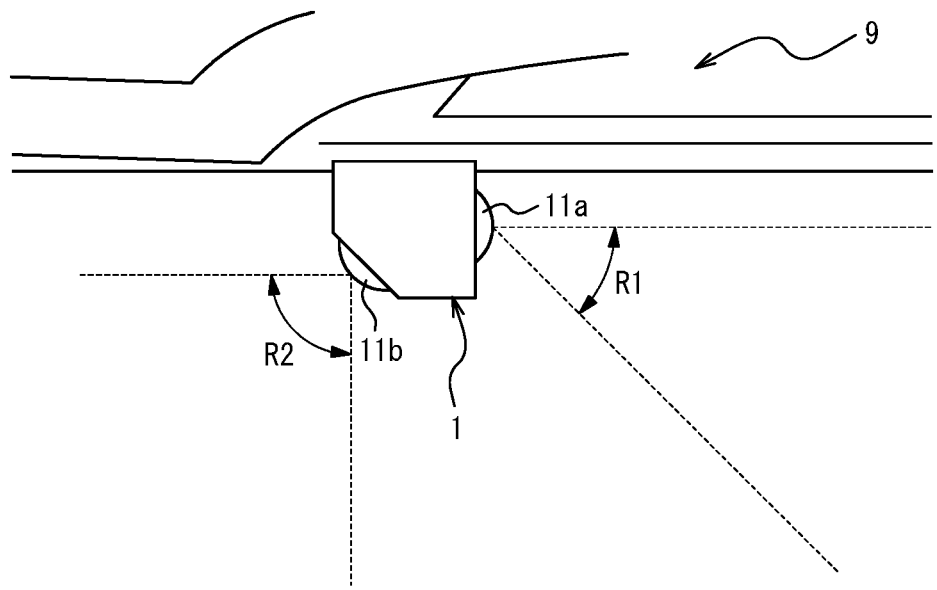
FIG. 7A is an enlarged view of the region R of FIG. 6, illustrating the appearance of the camera module at a first rotation position in the second embodiment.

FIG. 7A illustrates a region R at the upper-front portion of the front door when the first camera 11a and the second camera 11b are at the first rotation position in FIG. 6. As in FIG. 4A, the first camera 11a attached to the moveable body 9 faces the imaging direction D0 at the first rotation position and captures an image in the first imaging range R1. In an example in the second embodiment, the imaging direction D0 is a substantially horizontal direction. The angle between the imaging direction D0 and the front-back direction of the moveable body 9 is approximately 30°. The first camera 11a captures an image in the first imaging range R1, which is a predetermined angle of view, such as 60°, centered on the optical axis direction. The second camera 11b faces the first imaging direction D1 at the first rotation position and captures an image in the second imaging range R2. In an example in the second embodiment, the first imaging direction D1 is a substantially horizontal direction. The angle between the first imaging direction D1 and the front-back direction of the moveable body 9 is approximately 45°. The second camera 11b captures an image in the second imaging range R2, which is a predetermined angle of view, such as 90°, centered on the optical axis direction. Unlike the first embodiment, no overlapping range exists between the first imaging range R1 and the second imaging range R2 in the second embodiment.

Like the first embodiment, the controller 13 in the second embodiment generates the first processed image, the second processed image, and the third processed image on the basis of the first captured image and the second captured image acquired from the first camera 11a and the second camera 11b. The controller 13 outputs the generated first processed image, second processed image, and third processed image to the first selector 13a.

The controller 13 judges whether the first camera 11a has failed on the basis of the first captured image. When judging that the first camera 11a has not failed, the controller 13 controls the first selector 13a to output the first processed image and the second processed image.

Figure 7B:
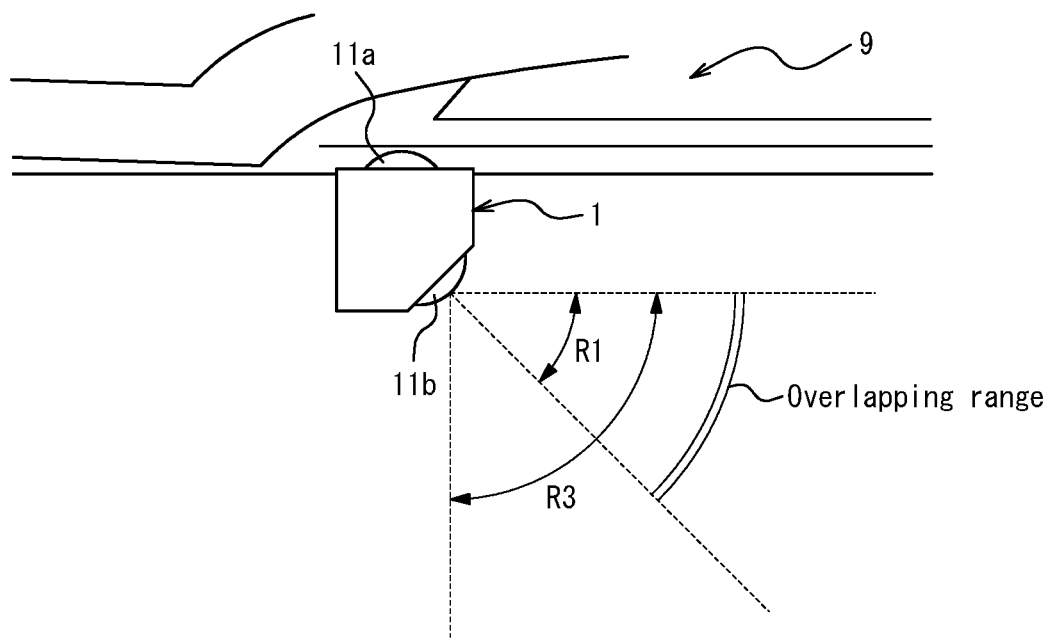
FIG. 7B is an enlarged view of the region R of FIG. 6, illustrating the appearance of the camera module at a second rotation position in the second embodiment.

When judging that the first camera 11a has failed, the controller 13 controls the drive unit 12b to set the rotary member 12a to the second rotation position. FIG. 7B illustrates a region R at the upper-front portion of the front door when the first camera 11a and the second camera 11b are at the second rotation position in FIG. 6. As in the first embodiment, the overlapping range between the third imaging range R3 and the first imaging range R1 is wider at this time than the overlapping range between the second imaging range R2 and the first imaging range R1. The controller 13 at this time controls the first selector 13a to output the third processed image.

In the second embodiment, the overlapping range between the first imaging range R1 and the third imaging range R3 is wider than the overlapping range between the first imaging range R1 and the second imaging range R2. Therefore, the view and subjects in the first imaging range R1 of the first camera 11a can be captured over a wider range in the third imaging range R3 than in the second imaging range R2. Even when the first camera 11a has failed, the second camera 11b can cover the first imaging range R1, thereby improving convenience for the driver.

Although the present disclosure is based on embodiments and drawings, it is to be noted that various changes and modifications will be apparent to those skilled in the art based on the present disclosure. Therefore, such changes and modifications are to be understood as included within the scope of the present disclosure. For example, the functions and the like included in the various members, units, steps, and the like may be reordered in any logically consistent way. Furthermore, when embodying a method according to the present disclosure, units or steps may be combined into one or divided.

The camera module 1 includes two cameras in the first embodiment and the second embodiment but may include three or more cameras. When the first camera 11a fails in this case, the controller 13 may select the camera having the angle of view closer to that of the first camera 11a as a substitute for the first camera 11a.

In the first and second embodiments, the drive unit 12b rotates the rotary member 12a to change the imaging direction of the first camera 11a and the second camera 11b. The drive unit 12b may, however, change the imaging direction of the first camera 11a and the second camera 11b using any method for changing orientation other than a method for rotation.

In the first and second embodiments, the controller 13 changes the imaging direction of the second camera 11b so that the overlapping range between the third imaging range R3 and the first imaging range R1 is greater than the overlapping range between the second imaging range R2 and the first imaging range R1. The controller 13 may, however, change the imaging direction of the second camera 11b so that the second imaging direction D2 of the second camera 11b substantially matches the imaging direction D0 of the first camera 11a. Alternatively, the controller 13 may change the imaging direction of the second camera 11b so that the third imaging range R3 includes the first imaging range R1.

In the first and second embodiments, the controller 13 changes the imaging direction of the first camera 11a and the second camera 11b and furthermore executes a conversion process to convert the second captured image into the third processed image. The controller 13 may, however, simply change the imaging direction of the first camera 11a and the second camera 11b, and an electronic control unit (ECU) or a car navigation system of the moveable body 9 may execute the conversion process to yield the third processed image.

Figure 8:
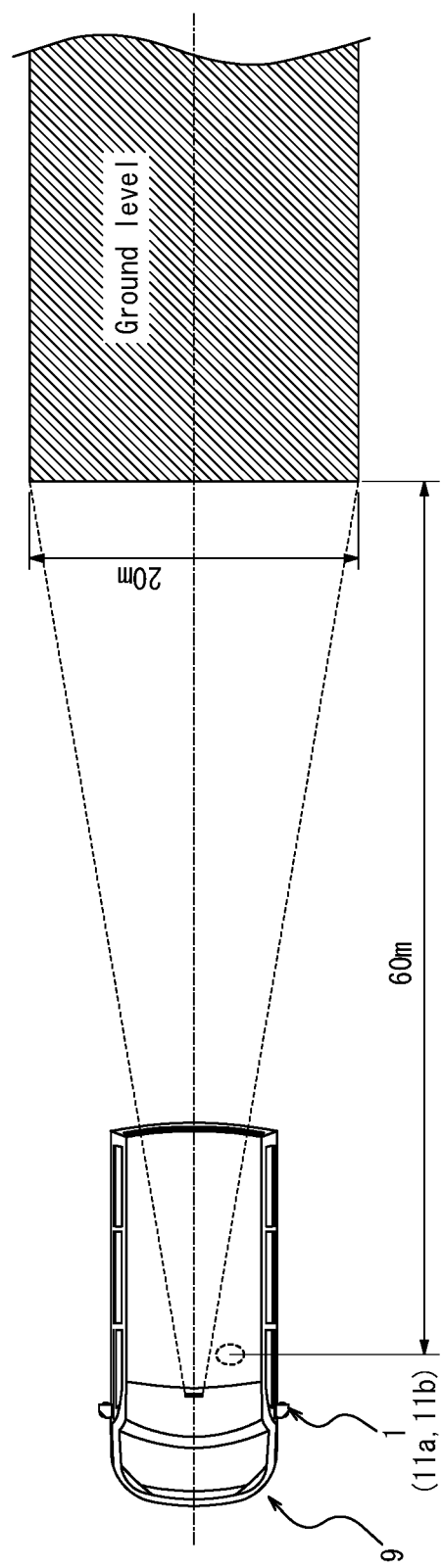
FIG. 8 illustrates a portion of an imaging range of a first camera in a modification as seen from above the moveable body.

In the first and second embodiments, the first camera 11a and the second camera 11b are attached to the side of the moveable body 9 but may instead be attached at a different position inside the cabin, on top, at the back, or the like of the moveable body 9. For example, the case of the camera module 1 being attached inside the cabin of the moveable body 9 is described. At the first rotation position, the orientation of the first camera 11a is determined to allow imaging of the view in the imaging range established by law, for example. The above-described "Proposal for Supplement 2 to the 04 series of amendments to Regulation No. 46 (Devices for indirect vision)", for example, stipulates that the imaging range have a left-right width of 20 m from a center line parallel to the front-back direction of the moveable body 9 at any position 60 m or more behind the driver on the ground, as illustrated in FIG. 8. When judging that the first camera 11a has failed, the controller 13 may therefore change the imaging direction of the second camera 11b so that the third imaging range R3 of the second camera 11b includes the imaging range illustrated in FIG. 8.

In the first and second embodiments, the camera module 1 is attached only to one side of the moveable body 9 but may instead be attached to both sides of the moveable body 9.

The controller 13 may generate both the second processed image and the third processed image regardless of the imaging direction of the second camera 11b. The controller 13 may generate the third processed image when the second camera 11b is facing the second imaging direction D2. The controller 13 may suspend generation of the third processed image when the second camera 11b is facing the first imaging direction D1. The controller 13 may generate the second processed image regardless of the imaging direction of the second camera 11b and generate the third processed image only when the second camera 11b is facing the second imaging direction D2.

The controller 13 may generate the second processed image when the second camera 11b is facing the first imaging direction D1. The controller 13 may suspend generation of the second processed image when the second camera 11b is facing the second imaging direction D2. The controller 13 may generate the third processed image regardless of the imaging direction of the second camera 11b and generate the second processed image only when the second camera 11b is facing the first imaging direction D1.

By causing the controller 13 to generate only one of the third processed image and the second processed image, the camera module 1 can reduce the processing load of the controller 13 as compared to when both images are always generated.

The controller 13 may generate the first processed image regardless of the imaging direction of the second camera 11b. The controller 13 may generate the first processed image when the second camera 11b is facing the first imaging direction D1. The controller 13 may suspend generation of the first processed image when the second camera 11b is facing the second imaging direction D2.

In the first and second embodiments, the controller 13 and the first selector 13a are separate components. The first selector 13a may, however, be provided internal to the controller 13. Furthermore, the first selector 13a may be a separate component from the camera module 1.

In the first and second embodiments, the first selector 13a outputs the second processed image when the second camera 11b is facing the first imaging direction D1 and outputs the third processed image when the second camera 11b is facing the second imaging direction D2. The first selector 13a may be replaced by a second selector 13b that is a separate selector, as described below. The second selector 13b outputs the first processed image to the first monitor 2a when the second camera 11b is facing the first imaging direction D1 and outputs the third processed image to the first monitor 2a when the second camera 11b is facing the second imaging direction D2. The second selector 13b may output the second processed image in addition to the first processed image to the first monitor 2a when the second camera 11b is facing the first imaging direction D1.

Much of the subject matter of the present disclosure is described as a series of operations executed by a computer system and other hardware that can execute program instructions. It should be noted that in each embodiment, various operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like include, for example, one or more of a microprocessor, CPU, application specific integrated circuit (ASIC), digital signal processor (DSP), programmable logic device (PLD), field programmable gate array (FPGA), processor, controller, microcontroller, microprocessor, electronic device, other apparatus designed to be capable of executing the functions disclosed here, and/or a combination of any of the above. The disclosed embodiments are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

A system including various modules and/or units that execute particular functions has been disclosed. It should be noted that these modules and units have been illustrated schematically to explain their functionality briefly and do not necessarily designate particular hardware and/or software. In this sense, it suffices for the modules, units, and other constituent elements to be hardware and/or software implemented so as to substantially execute the particular functions described here. The various functions or different constituent elements may be combined with or separated from hardware and/or software in any way, and each may be used individually or in some combination. An input/output (I/O) device or user interface including, but not limited to, a keyboard, display, touchscreen, or pointing device may be connected to the system directly or via an I/O controller. In this way, the various subject matter disclosed herein may be embodied in a variety of forms. All such embodiments are included in the scope of the present disclosure.

The references to "first", "second", and "third" in the present disclosure are identifiers for distinguishing between elements. As necessary, the identifiers may be switched for the members designated by the references to "first", "second", and "third" in the present disclosure. For example, the identifiers "first" and "second" of the first camera 11a and the second camera 11b may be switched. The identifiers may be removed as necessary. Elements from which the identifiers are removed are distinguished by their reference sign. The identifiers may be changed to any number as necessary. Any identifier may be added as necessary to a component mentioned in the present disclosure. For example, "first" may be added to refer to the controller 13 as the first controller 13. The identifiers such as "first", "second", and "third" in the present disclosure may not be used as an interpretation of the order of components.

The invention claimed is:

1. A camera module comprising:
a first camera, the first camera configured to capture images in a first imaging range;
a second camera capable of switching between a first imaging direction and a second imaging direction, the second camera configured to
capture images in a second imaging range when facing the first imaging direction, and
capture images in a third imaging range when facing the second imaging direction; and
wherein an overlapping range between the first imaging range and the third imaging range is greater than an overlapping range between the first imaging range and the second imaging range; and
a controller, the controller configured to:
acquire a first captured image captured by the first camera;
execute a first process on the acquired first captured image to generate a first processed image;
acquire a second captured image captured by the second camera;
generate a second processed image yielded by execution of a second process on the acquired second captured image; and
generate a third processed image yielded by execution of a third process on the acquired second captured image, the third process being different from the second process,
wherein an overlapping range between the first processed image and the third processed image is greater than an overlapping range between the first processed image and the second processed image.

2. The camera module of claim 1, wherein the controller is configured to generate the third processed image when the second camera is facing the second imaging direction.

3. The camera module of claim 1, wherein the controller is configured to generate the second processed image when the second camera is facing the first imaging direction.

4. The camera module of claim 1, wherein the controller is configured to generate the third processed image regardless of the imaging direction of the second camera.

5. The camera module of claim 4, wherein the controller is configured to generate the second processed image when the second camera is facing the first imaging direction.

6. The camera module of claim 1, wherein the controller is configured to generate the second processed image regardless of the imaging direction of the second camera.

7. A camera module comprising:
a first camera, the first camera configured to capture images in a first imaging range;
a second camera capable of switching between a first imaging direction and a second imaging direction, the second camera configured to
capture images in a second imaging range when facing the first imaging direction, and
capture images in a third imaging range when facing the second imaging direction; and
wherein an overlapping range between the first imaging range and the third imaging range is greater than an overlapping range between the first imaging range and the second imaging range;
a controller, the controller configured to:
acquire a first captured image captured by the first camera;
execute a first process on the acquired first captured image to generate a first processed image;
acquire a second captured image captured by the second camera;
generate a second processed image yielded by execution of a second process on the acquired second captured image; and
generate a third processed image yielded by execution of a third process on the acquired second captured image, the third process being different from the second process; and
a selector configured to output the second processed image when the second camera is facing the first imaging direction; and
output the third processed image when the second camera is facing the second imaging direction.

8. A camera module comprising:
a first camera, the first camera configured to capture images in a first imaging range;
a second camera capable of switching between a first imaging direction and a second imaging direction, the second camera configured to
capture images in a second imaging range when facing the first imaging direction, and
capture images in a third imaging range when facing the second imaging direction; and
wherein an overlapping range between the first imaging range and the third imaging range is greater than an overlapping range between the first imaging range and the second imaging range;
a controller, the controller configured to:
acquire a first captured image captured by the first camera;
execute a first process on the acquired first captured image to generate a first processed image;
acquire a second captured image captured by the second camera;
generate a second processed image yielded by execution of a second process on the acquired second captured image; and
generate a third processed image yielded by execution of a third process on the acquired second captured image, the third process being different from the second process; and
a selector configured to
output the first processed image to a first monitor when the second camera is facing the first imaging direction; and
output the third processed image to the first monitor when the second camera is facing the second imaging direction.

9. A selector configured to
acquire a first processed image generated by execution of a first process on a first captured image acquired from a first camera;
acquire a second processed image generated by execution of a second process on a second captured image acquired from a second camera capable of switching between a first imaging direction and a second imaging direction, the second process being executed when the second camera is facing the first imaging direction;
acquire a third processed image generated by execution of a third process on the second captured image when the second camera is facing the second imaging direction;
output the first processed image when the second camera is facing the first imaging direction; and
output the third processed image when the second camera is facing the second imaging direction.

10. A controller comprised in a camera module,
wherein the controller is configured to
acquire a first captured image captured by a first camera, the first camera configured to capture images in a first imaging range;
execute a first process on the acquired first captured image to generate a first processed image;
acquire a second captured image captured by a second camera, the second camera capable of switching between a first imaging direction and a second imaging direction;
generate a second processed image yielded by execution of a second process on the acquired second captured image; and
generate a third processed image yielded by execution of a third process on the acquired second captured image, the third process being different from the second process,
wherein an overlapping range between the first processed image and the third processed image is greater than an overlapping range between the first processed image and the second processed image.

11. A camera monitoring system comprising:
a first camera;
a second camera capable of switching between a first imaging direction and a second imaging direction;
a controller, the controller configured to
  acquire a first captured image from the first camera;
  execute a first process on the first captured image to generate a first processed image;
  acquire a second captured image from the second camera;
  execute a second process on the second captured image captured when the second camera is facing the first imaging direction to generate a second processed image; and
  execute a third process on the second captured image captured when the second camera is facing the second imaging direction to generate a third processed image; and
a monitor, the monitor configured to
  display the first processed image when the second camera is facing the first imaging direction; and
  display the third processed image when the second camera is facing the second imaging direction.

12. A moveable body comprising:
a first camera;
a second camera capable of switching between a first imaging direction and a second imaging direction;
a controller, the controller configured to
  acquire a first captured image from the first camera;
  execute a first process on the first captured image to generate a first processed image;
  acquire a second captured image from the second camera;
  execute a second process on the second captured image captured when the second camera is facing the first imaging direction to generate a second processed image; and
  execute a third process on the second captured image captured when the second camera is facing the second imaging direction to generate a third processed image; and
a monitor, the monitor configured to
  display the first processed image when the second camera is facing the first imaging direction; and
  display the third processed image when the second camera is facing the second imaging direction.

* * * * *